United States Patent [19]

Udipi

[11] Patent Number: 5,104,934
[45] Date of Patent: Apr. 14, 1992

[54] POLYMER BLENDS OF POLYCARBONATE, PETG AND ABS

[75] Inventor: Kishore Udipi, Longmeadow, Mass.

[73] Assignee: Monsanto Company, St. Louis, Mo.

[21] Appl. No.: 746,055

[22] Filed: Aug. 12, 1991

Related U.S. Application Data

[63] Continuation of Ser. No. 452,658, Dec. 15, 1989, abandoned.

[51] Int. Cl.$^5$ .............. C08L 69/00; C08L 67/02; C08L 55/02
[52] U.S. Cl. .................................. 525/67; 525/64; 525/133; 525/146; 525/148; 525/439
[58] Field of Search .............. 525/67, 133, 146, 148, 525/439

[56] References Cited

U.S. PATENT DOCUMENTS

| | | | |
|---|---|---|---|
| 3,864,428 | 2/1975 | Nakamura et al. | 260/873 |
| 4,096,202 | 6/1978 | Farnham | 523/201 |
| 4,111,895 | 9/1978 | Gergen et al. | 260/42.18 |
| 4,180,494 | 12/1979 | Fromuth et al. | 260/40 |
| 4,220,735 | 9/1980 | Dieck et al. | 525/90 |
| 4,239,676 | 12/1980 | Dieck | 260/40 R |
| 4,257,937 | 3/1981 | Cohen et al. | 260/40 |
| 4,264,487 | 4/1981 | Fromuth et al. | 260/40 |
| 4,554,314 | 11/1985 | Chung et al. | 525/67 |
| 4,604,423 | 8/1986 | Liu | 524/508 |
| 4,628,074 | 12/1986 | Boutni | 525/146 |
| 4,654,400 | 3/1987 | Lohmeijer et al. | 525/64 |
| 4,775,717 | 10/1988 | Ishihara | 525/67 |
| 4,786,692 | 11/1988 | Allen | 525/92 |

FOREIGN PATENT DOCUMENTS

| | | |
|---|---|---|
| 0108996 | 5/1984 | European Pat. Off. . |
| 0110222 | 6/1984 | European Pat. Off. . |
| 0111810 | 6/1984 | European Pat. Off. . |
| 0153470 | 9/1985 | European Pat. Off. . |
| 0175220 | 3/1986 | European Pat. Off. . |

Primary Examiner—James J. Seidleck
Assistant Examiner—David Buttner
Attorney, Agent, or Firm—Thomas E. Kelley; Richard H. Shear; William J. Farrington

[57] ABSTRACT

Polymer blends useful as thermoplastic molding resins comprise polycarbonate, PETG and ABS or ASA exhibit enhanced moldability, heat resistance and thick section impact resistance not available in binary blends of the components.

18 Claims, No Drawings

POLYMER BLENDS OF POLYCARBONATE, PETG AND ABS

This is a continuation of application Ser. No. 07/452,658 filed on Dec. 15, 1989 now abandoned.

Disclosed herein are polymer blends of polycarbonate, polyester and graft rubber compositions which are useful as engineering thermoplastic molding resins. Also disclosed are methods of making and using such polymer blends.

BACKGROUND OF THE INVENTION

As used herein compositions are described by weight percent. To facilitate an understanding of this invention the variety of polymers discussed herein shall be referred to by their common acronyms. However in the examples the acronyms refer to the specific polymers identified therein.

Unless indicated otherwise the term "PC" as used herein means an aromatic polycarbonate derived from the reaction of bisphenol-A and phosgene; such PC is commercially available from General Electric Company under the LEXAN trademark, from the Dow Chemical Company under the CALIBRE trademark and from Mobay Corporation under the MAKROLON trademark, including modifications of such polymers such as halogenated polycarbonate.

Unless indicated otherwise the term "PETG" as used herein means an amorphous polyester of terephthalic acid and a mixture of predominately ethylene glycol and a lesser amount of 1,4-cyclohexanedimethanol; such PETG was commercially available from Eastman Chemical Company under the KODAR trademark and is currently sold under the EKTAR trademark.

Unless indicated otherwise the term "PCTG" as used herein means an amorphous polyester of terephthalic acid and a mixture of predominately 1,4-cyclohexanedimethanol and a lesser amount of ethylene glycol, such PCTG was commercially available from Eastman Chemical Company under the KODAR trademark and is currently sold under the EKTAR trademark.

Unless indicated otherwise the term "PET" as used herein means a crystallizable polyalkylene terephthalate, i.e. a polyester of terephthalic acid and ethylene glycol; such PET is commercially available from The Goodyear Tire & Rubber Company under the CLEAR-TUF trademark.

Unless indicated otherwise the term "PBT" as used herein means a crystallizable polyalkylene terephthalate, i.e. a polyester of terephthalic acid and butanediol; such PBT is commercially available from General Electric Company under the VALOX trademark.

Unless indicated otherwise, the term "ABS" as used herein means a graft rubber composition comprising a substrate of butadiene or copolymers of butadiene and styrene or acrylonitrile which substrate is grafted with styrene and acrylonitrile or derivatives thereof, e.g. α-methyl styrene and methacrylonitriles. ABS typically also comprises extractable styrene-acrylonitrile copolymer, i.e. copolymer not grafted to the rubber; such ABS is commercially available from Monsanto Company under the LUSTRAN trademark.

Unless indicated otherwise the term "ASA" as used herein means a graft rubber composition comprising a crosslinked acrylate rubber substrate e.g. butyl acrylate grafted with styrene and acrylonitrile or derivatives thereof, e.g. α-methyl styrene or methacrylonitrile, such ASA is commercially available from General Electric Company under the GELOY and/or LURAN trademark.

Unless indicated otherwise the term "MBS" as used herein means a graft rubber composition comprising a substrate of butadiene or mixtures of butadiene and styrene or acrylonitrile grafted with styrene and methacrylate; such MBS is commercially available from Rohm & Haas Company under the PARALOID trademark.

Unless indicated otherwise the term "AIM" as used herein means an acrylate impact modifier such as a graft rubber composition comprising a crosslinked acrylate rubber grafted with an acrylate thermoplastic; such AIM is as commercially available from Rohm & Haas Company under the PARALOID trademark.

Nakamura et al. disclose in U.S. Pat. No. 3,864,428 blends of crystallizable polyester, such as polyalkylene terephthalates, e.g. PET or PBT, or polyalkylene naphthalates, PC and graft copolymers, e.g. MBS, having lower melt viscosity than PC alone.

Cohen et al. disclose in U.S. Pat. No. 4,257,937 blends of PBT (optionally PET), PC and polyacrylate.

Fromuth et al. disclose in U.S. Pat. Nos. 4,180,494 and 4,264,487 blends of PET, PC and AIM.

Lohmeijer et al. disclose in U.S. Pat. No. 4,654,400 blends of PC, PBT and AIM.

Blends of PET and/or PBT, PC and styrene-butadiene block copolymers are disclosed in U.S. Pat. Nos. 4,220,735, 4,239,677 and 4,111,895.

Chung et al. disclose in European Patent Application EP 0 108 996 A1 that impact properties of thermoplastic blends of polyalkylene terephthalate, e.g. PET, PC and an elastomeric based graft copolymer, e.g. ABS, are increased by the addition of a modifying oil. More specifically, Chung et al. illustrated that the addition of naphthenic oil (3.11%) improved the toughness of a blend of 64.2% PET, 14.2% PC and 21.4% ABS.

Allen et al. disclose in European Patent Application EP 0 111 810 A2 that a disadvantage associated with the use of polyalkylene terephthalate is its relatively low notched impact strength which carries over into blends of the polyester with PC. It is further disclosed that amorphous copolyesters e.g. PETG or PCTG, can be used in polycarbonate blends to improve in impact strength, transparency, processability, solvent resistance and environmental stress cracking resistance.

Boutni discloses in U.S. Pat. No. 4,628,074 blends of PC, PCTG and EPDM.

Ishihara discloses in U.S. Pat. No. 4,775,717 blends of PC and (graft modified) polystyrene having high heat resistance; improvements in melt viscosity are at the expense of toughness (e.g. see Table 1).

Liu discloses in U.S. Pat. No. 4,604,423 improving the impact strength of glass fiber-filled PC with a minor amount of amorphous polyester, e.g. PETG or PCTG and an olefin acrylate polymer.

Key properties for assessing the polymer blends of this invention are: melt flow into a mold as characterized by "Spiral Flow" (determined hereinbelow); heat resistance as characterized by heat distortion temperature under load (HDTUL) measured in accordance with ASTM D648; and impact resistance as characterized by notched Izod impact resistance of 3.2 cm (⅛ inch) thick samples (IZOD-⅛) and thick section notched Izod impact resistance of 6.4 cm (¼ inch) thick samples (IZOD-¼), measured at room temperature (23° C.) in accordance with ASTM D-256.

Although polymer blends are prepared to provide a more desirable balance of properties as compared to the properties of the component polymers, there are often deficiencies in one or more properties of the polymer blend. For instance, popular commercial blends comprising PC and ABS have higher heat resistance than ABS alone and higher impact resistance in thick sections than PC alone; but a limitation of such blends is less than desired flow properties for many injection molding applications. Commercially available blends of PC and amorphous polyester have desirable heat resistance but low impact resistance, especially in thick sections, and less than desired melt flow into a mold for many injection molding applications. Other blends of amorphous polyester and ABS have adequate melt flow into a mold but are generally so deficient in heat and impact resistance as to be undesirable as a molding resin.

SUMMARY OF THE INVENTION

I have discovered that polymer blends consisting essentially of PC, amorphous polyester, i.e. PETG, and graft rubber composition, i.e. ABS or ASA or mixtures thereof, can be provided with a surprisingly advantageous balance of properties which makes such polymer blends especially useful as thermoplastic molding resins. Certain polymer blends of this invention comprise at least 10% PETG and have improved melt flow into a mold, e.g. Spiral Flow of about 27 cm, compared to blends of PC and ABS having a Spiral Flow of about 24 cm, without adverse reduction in thick section impact resistance and heat resistance properties common to blends of PC and ABS; more preferred blends comprise at least 20% PETG and more preferrably 30% PETG.

Certain other polymer blends of this invention comprise at least 10% PC and have substantially improved heat resistance, e.g. HDTUL of 74° C., and and substantially improved thick section impact resistance, e.g. IZOD-$\frac{1}{4}$ of about 260 Joules/meter (J/m), as compared to blends of ABS and PETG having HDTUL of only about 70° C. and IZOD-$\frac{1}{4}$ of about 130 J/m, without adverse effect on the high melt flow into a mold common to blends of ABS and PETG; more preferred blends comprise at least 20% PC and more preferrably 30% PC. Still other polymer blends of this invention comprise at least about 10% graft rubber composition, i.e. ABS or ASA, and have substantially improved melt flow into a mold, e.g. Spiral Flow of about 25 cm, and substantially improved impact resistance, e.g. IZOD-1/8 of about 800 J/m and IZOD-$\frac{1}{4}$ of about 100 J/m, as compared to blends of PC and PETG having Spiral Flow of less than 20 cm, IZOD-$\frac{1}{8}$ of about 70 J/m, and I20D-$\frac{1}{4}$ of less than about 60 cm, without significant adverse effect on high heat resistance common to blends of PC and PETG; more preferred blends comprise at least 20% graft rubber compositions and more preferrably at least 30% graft rubber compositions. Preferred blends of this invention exhibit high melt flow into a mold, e.g. Spiral Flow of at least 27.5 cm; other preferred polymer blends exhibit improved heat resistance, e.g. HDTUL of at least 75° C.; and still other preferred polymer blends exhibit substantially improved notched impact resistance, especially in thick sections, e.g. IZOD-$\frac{1}{4}$ of at least 130 J/m (2.5 footpounds/inch), preferably at least 300 J/m more preferably at least 500 J/m.

Another aspect of this invention comprises polymer blends containing a low amount of ethyleneacrylate copolymer rubber, e.g. less than 10 percent by weight of the polymer blend. It has been discovered that substitution of a minor amount of ABS with ethylene-acrylate copolymer rubber can provide enhanced melt flow int a mold and thick section impact resistance.

PROCEDURE FOR SPIRAL FLOW

A useful rheological characterization for melt flow into a mold of a molten polymer blend can be measured by injecting a molten resin into a mold having a small, fixed cross sectional area over an elongated flow path under standard conditions. A moldability index is the length of the elongated flow path that is filled before solidification of the injected polymer at specified molding conditions, i.e. volumetric injection rate, mold temperature, polymer melt temperature and mold volume. Mold configurations commonly used include half round profiles extended in spiral or serpentine shapes. The moldability index of the polymer blends of this invention exemplified hereinbelow was characterized by "Spiral Flow" which is the length of a spiral, elongated half round mold that is injected with molten polymer under specified injection molding conditions. Numerical values of parameters used to define "Spiral Flow" apparatus and methods are nominal. For "Spiral Flow" the mold is cut into a flat surface with a round broach having a radius of 2.77 mm (0.109 inch) to a depth of 2.77 mm and a length of at least 42 cm; a 5 to 15 cm long runner connects from a 4 mm (diameter) sprue to the mold at the beginning of the spiral; the runner has a cross sectional area between 2 and 4 times the cross-sectional area of the half round mold. The mold is maintained at 40° to 50° C. (110° F.); the polymer or blend of polymers is at a temperature between 250° to 280° C. (510° F.) as measured in an "air shot" of molten polymer and is injected in a mold volume (i.e. volume of the sprue, runner and half round length) between 20% and 60% of the maximum shot volume of the injection molder and at an injection rate between 3 and 7 cm$^3$/second.

To avoid variations, "Spiral Flow" is measured after equilibrating the molding cycle (e.g. after about 20 cycles) and is determined as the average half round injection length of 12 consecutive moldings having a molding cycle between 10 and 30 seconds. A typical 21 second molding cycle comprises the following time sequence: delayed injection—1 second, injection—6 seconds, hold—6 seconds, cooling—6 seconds, and mold open—2 seconds. The throttle valve is wide open and the injection pressure is adjusted to provide a calibration half round mold length (i.e. base line Spiral Flow) between 18 and 20 cm for a 50/50 blend of the PC and PETG which are used in the blends. Improvements in melt flow into a mold are indicated by Spiral Flow lengths greater than the base line Spiral Flow.

DETAILED DESCRIPTION OF PREFERRED EMBODIMENTS

Grafted rubber compositions used in the blends of this invention comprise ABS, ASA or a mixture thereof.

ABS used in the polymer blends of this invention comprises from 5 to 80 weight percent of a substrate butadiene-based rubber having a glass transition temperature below 0° C. and from 95 to 20 weight percent of a styrene-acrylonitrile copolymer consisting essentially of from 20 to 75 parts by weight of a styrene monomer and from 80 to 25 parts by weight of acrylonitrile or methacrylonitrile, said copolymer having been polymerized in the presence of and grafted onto the substrate rubber, e.g. by well known methods such as graft emulsion polymerization. Typically, some of the styrene-acrylonitrile copolymer is extractable, i.e. not grafted to the rubber. Styrene monomers can comprise styrene, substituted styrene such as alphamethyl styrene, chlorostyrene, bromostyrene, para-methyl styrene and the like or a mixture thereof. The butadiene substrate rubber can be crosslinked, and in many cases is preferably crosslinked, and can comprise a butadiene-acrylonitrile rubber or styrene-butadiene rubber. Preferably, ABS comprises from 20 to 45 weight percent of substrate butadiene rubber and from 55 to 80 parts by weight of styrene-acrylonitrile copolymer. Preferred styrene-acrylonitrile copolymer comprises from 50 to 75 parts by weight of styrene monomer units and from 25 to 50 parts by weight of said polar monomer units. Especially preferred ABS comprises styrene and acrylonitrile in the ratio of about 70/30.

ASA used in the polymer blends of this invention can comprise about 20 to 60 weight percent of a substrate acrylate rubber, e.g. about 45 weight percent cross linked butyl acrylate rubber, grafted with styrene and acrylonitrile in the proportion and manner of ABS, as described above.

In addition to the above components the polymer blends of this invention can advantageously contain other additives common to polymer blends of engineering thermoplastics such as antioxidants, stabilizers, flame retardants, dyes, pigments, fillers such as fibers and minerals, plasticizers and the like.

The component polymers of the polymer blends of this invention can be assembled by any convenient mixing process, e.g. extrusion blended in a single or twin screw extruder or in a high intensity mixer such as a Banbury Mixer or Farrell Continuous Mixer.

The polymer blends of this invention are especially useful as engineering thermoplastics for applications warranting a balance of properties inherent in such blends, including chemical resistance, e.g. to mineral acids such as muriatic acid; low mold shrinkage, e.g. about 6 mils/inch (0.6 %); good mechanical properties, e.g. tensile strength and elongation, high toughness, e.g. good notched Izod impact resistance even at low temperatures;

The invention is now described with reference to the following examples which are for purposes of illustration only and are not intended to imply any limitation on the scope of the invention.

The polymer blends described in the following examples contained about 0.75 percent by weight of an antioxidant mixture comprising 2 parts by weight alkylated phenol obtained from Ethyl Corp as Ethanox 330 and 1 part by weight dilaurylthiodipropionate obtained from Morton Thiokol Company.

In the following examples components were dried before mixing under vacuum, e.g. PC at about 110° C., PETG at about 70° C., and ABS and ASA at about 65° C.

When VAMAC was used, it was preblended with ABS intimately mixed at about 100 rpm in a Killion single screw extruder (3.8 cm diameter). The blended components were fed to a Leistritz twin screw extruder equipped with a die-faced pelletizer. The polymer blend was extruded into a water bath and pelletized.

For characterization the polymer blends were injection molded into specimen bars which were then notched for Izod impact resistance testing according to ASTM D-256 where the notch radius was 0.01 inches and the measurements were conducted at room temperature (about 23° C.). In the following examples the term "IZOD $\frac{1}{8}$" refers to the notched Izod impact resistance measured on a $\frac{1}{8}$ inch thick specimen bar; and the term "IZOD $\frac{1}{4}$", on a $\frac{1}{4}$ inch thick specimen bar. Izod impact resistance is reported in Joules/meter (J/m). The term "HDTUL" refers to heat distortion temperature measured on $\frac{1}{8}$ inch thick specimen bars stressed at 264 psi according to ASTM D 648. HDTUL is reported in degrees Celcius (° C). The term "Spiral Flow" refers to a polymer melt flow characterization where defined herein above. Spiral Flow is reported in centimeters (cm).

The following specification identifies the specific polymers used in the examples:

ABS—38 weight percent nitrile rubber particles (average particle size 0.2 microns) having a butadiene/acrylonitrile ratio of 93/7; 62 weight percent styrene-acrylonitrile copolymer having a styrene/acrylonitrile ratio of 73/27.

PC—Calibre TM M300-6 polycarbonate obtained from Dow Chemical Company.

PETG—KODAR TM 6763 PETG obtained from Eastman Chemical Company.

VAMAC-VAMAC TM G elastomer copolymer of, ethylene, methyl acrylate and monoethyl maleate from DuPont.

PET—KODAR TM 6307 PET obtained from Eastman Chemical Company, viscosity 0.63.

ASA—butyl acrylate rubber grafted with styreneacrylonitrile copolymer, 45% rubber.

MBS—PARALOID TM BTA-733 MBS obtained from Rohm & Haas Company, 75% rubber.

AIm—ACRYLOID TM KM-330 AIM obtained from Rohm & Haas Company, 75% rubber.

EPDM—EPCAR TM EPDM obtained from B.F. Goodrich

NITRILE—HYCAR TM VT 380P nitrile rubber obtained from B.F. Goodrich.

PEO—HYTREL TM 4056 polytetramethylene oxide/poly butyleneterephthalate block copolymer elastomer obtained from DuPont.

EXAMPLE 1

This example serves to illustrate that the incorporation of ABS in prior art polymer blends of PC and PETG provides polymer blends according to this invention having improved melt flow and impact resistance and retaining a desirably high heat resistance. The results reported in Table 1 show that the incorporation of only 10 percent ABS substantially improves melt flow, e.g. by about 25 percent over blends of PC and PETG; thick section toughness is about doubled. Further increases in ABS, i.e. an additional 10 percent increment, provides blends with spiral flow number above 27.5 cm and about a 50 percent increase in thick section toughness.

TABLE 1

| Polymer | Blend Composition (weight percent) | | | | |
|---|---|---|---|---|---|
| PC | 50 | 45 | 40 | 35 | 30 |
| PETG | 50 | 45 | 40 | 35 | 30 |
| ABS | 0 | 10 | 20 | 30 | 40 |
| | Properties | | | | |
| Spiral Flow (cm) | 19.5 | 25.5 | 27.5 | 29.3 | — |
| HDTUL (°C.) | 95 | 90 | 85 | 84 | — |
| Izod - $\frac{1}{8}$ (J/m) | 73 | 832 | 780 | 676 | 624 |

TABLE 1-continued

| | | | | | |
|---|---|---|---|---|---|
| Izod - ⅛ | 57 | 99 | 140 | 520 | 520 |
| Izod - ⅛* | — | — | 676 | — | — |
| Izod - ⅛* | — | — | 520 | — | — |

*annealed at 80 C. overnight

EXAMPLE 2

This example serves to illustrate that the incorporation of PETG in prior art polymer blends of PC and ABS provides polymer blends according to this invention having improved melt flow and retaining desirably high impact and heat resistance. The results reported in Table 2 show that the incorporation of only 10 percent PETG into blends of PC and ABS substantially improves melt flow, e.g. to a Spiral Flow number of about 27. Exceptionally high thick section toughness and heat resistance common in blends of PC and ABS are retained even when further incremental amounts of PETG are added, e.g. to enhance melt flow properties.

TABLE 2

| Polymer | Blend Composition (weight percent) | | | |
|---|---|---|---|---|
| PC | 50 | 45 | 40 | 35 |
| ABS | 50 | 45 | 40 | 35 |
| PETG | 0 | 10 | 20 | 30 |
| | Properties | | | |
| Spiral FLow (cm) | 24 | 27 | 28 | 30 |
| HDTUL (°C.) | 99 | 96 | 94 | 85 |
| Izod - ⅛ (J/m) | 520 | 520 | 624 | 624 |
| Izod - ⅛ | 468 | 520 | 520 | 364 |

EXAMPLE 3

This example serves to illustrate that the incorporation of PC in prior art polymer blends of PETG and ABS provides polymer blends according to this invention having improved heat and impact resistance while retaining desirably high melt flow, as characterized by Spiral Flow. The results reported in Table 3 show that the incorporation of only 10 percent PC with substantially improved heat resistance, i.e. an increase of 4 C over the heat resistance of blends of PETG and ABS; thick section toughness is about doubled. Further increases in PC, e.g. in additional 10 percent increments, provides blends which retain exceptionally high melt flow properties with improvements in thick section toughness and heat resistance.

TABLE 3

| Polymer | Blend Composition (weight percent) | | | |
|---|---|---|---|---|
| PETG | 50 | 45 | 40 | 35 |
| ABS | 50 | 45 | 40 | 35 |
| PC | 0 | 10 | 20 | 30 |
| | Properties | | | |
| Spiral Flow (cm) | 40 | 38 | 35 | 32 |
| HDTUL (°C.) | 70 | 74 | 76 | 79 |
| Izod - ⅛ (J/m) | 624 | 676 | 624 | 676 |
| Izod - ⅛ | 130 | 260 | 312 | 520 |

EXAMPLE 4

This example serves to illustrate that exceptional injection molding resin properties can be achieved in polymer blends according to this invention when the polymer blends are fortified with a minor amount of elastomer, e.g. elastomeric terpolymer of ethylene, methyl acrylate and monmethyl maleate (VAMAC).

The results reported in Table 4 show that the incorporation of 3 percent by weight of VAMAC (displacing an equal amount of ABS) in a blend of PC, PETG and ABS provides an enhancement of thick section toughness, while reducing melt flow. The incorporation of higher amounts of VAMAC provides surprisingly advantageous properties useful for thermoplastic injection molding resins. For instance, 6 percent VAMAC provides substantial enhancement (about 5 times) in thick section toughness; and, 9 percent VAMAC provides exceptional melt flow.

TABLE 4

| Polymer | Blend Compositions (weight percent) | | | | | |
|---|---|---|---|---|---|---|
| PC | 45 | 45 | 40 | 40 | 35 | 35 |
| PETG | 45 | 45 | 40 | 40 | 35 | 35 |
| ABS | 10 | 7 | 20 | 14 | 30 | 21 |
| VAMAC | 0 | 3 | 0 | 6 | 0 | 9 |
| | Properties | | | | | |
| Spiral Flow (cm) | 25.5 | 24 | 27.5 | 28.3 | 29.3 | 33.5 |
| HDTUL (°C.) | 90 | 87 | 86 | 85 | 84 | 80 |
| Izod - ⅛ (J/m) | 823 | 884 | 780 | 780 | 676 | 780 |
| Izod - ⅛ | 99 | 187 | 140 | 676 | 520 | 676 |

EXAMPLE 5

This example serves to illustrate the improved impact resistance imparted to blends of PC and ABS by the use of amorphous polyester, i.e. PETG, as compared to use of crystallizeable polyester, i.e. PET.

TABLE 5

| Polymer | Blend Compositions (weight percent) | | | |
|---|---|---|---|---|
| PC | 40 | 40 | 35 | 35 |
| ABS | 40 | 40 | 35 | 35 |
| PET | 20 | — | 30 | — |
| PETG | — | 20 | — | 30 |
| | Properties | | | |
| Spiral FLow (cm) | 36 | 29 | 40 | 29 |
| HDTUL (°C.) | 91 | 93 | 77 | 83 |
| Izod - ⅛ (J/m) | 300 | 460 | 160 | 430 |
| Izod - ⅛ | 290 | 440 | 140 | 380 |

EXAMPLE 6

This example illustrates the unpredictability of achieving a desirable balance of properties in blends of PC, PETG and rubbers or rubber-containing polymers.

A variety of rubbers and rubber-containing polymers were blended with a 50/50 blend of PC and PETG at a rubber level of 12%. As indicated by the properties reported in Table 6, acrylate rubber grafted with styrene and acrylonitrile (ASA) provides ternary blends with a good balance of properties which are generally comparable to blends with ABS, e.g. ASA provides ternary blends with higher melt flow and slightly lower thick section impact resistance. Other ternary blends with a favorable balance of properties were provided with nitrile rubber and ethylene-acrylate copolymer rubber. For instance, nitrile rubber provided a blend with good impact resistance, an acceptable reduction of heat distortion temperature and marginal improvement in melt flow. Ethylene-acrylate copolymer rubber provided a blend with good impact resistance and acceptable melt flow and heat distortion.

Other materials provided ternary blends with properties lower than those of the binary blend of PC and PETG. For instance, polybutadiene rubber grafted with styrene and methylmethacrylate (MBS), acrylate rubber grafted with acrylate thermoplastic (AIM) and EPDM rubber provided blends with a reduced melt flow as compared to the binary blend of PC and PETG. Elastomer-thermoplastic block copolymer (PEO) provided a blend with lower heat distortion and substantially lower impact resistance.

TABLE 6

| Polymer | Blend Composition (weight percent) | | | | | | | | |
|---|---|---|---|---|---|---|---|---|---|
| PC | 50 | 35 | 36.5 | 44 | 44 | 42 | 42 | 44 | 44 |
| PETG | 50 | 35 | 36.5 | 44 | 44 | 42 | 42 | 44 | 44 |
| ABS | — | 30 | — | — | — | — | — | — | — |
| ASA | — | — | 2 | — | — | — | — | — | — |
| Nitrile | — | — | — | 12 | — | — | — | — | — |
| VAMAC | — | — | — | — | 12 | — | — | — | — |
| MBS | — | — | — | — | — | 16 | — | — | — |
| AIM | — | — | — | — | — | — | 16 | — | — |
| EPDM | — | — | — | — | — | — | — | 12 | — |
| PEO | — | — | — | — | — | — | — | — | 12 |
| Properties | | | | | | | | | |
| Spiral Flow (cm) | 24.5 | 29.3 | 34.5 | 27 | 28.3 | 23 | 22 | 22 | 28 |
| HDTUL (°C.) | 99 | 84 | 82 | 81 | 83 | 83 | 84 | 85 | 73 |
| Izod - ⅛ (J/m) | 540 | 676 | 720 | 864 | 830 | 760 | 821 | 760 | 55 |
| Izod - ¼ | 460 | 520 | 304 | 700 | 625 | 710 | 710 | 610 | 53 |

The preceding description is set forth for purposes of illustration only and is not intended to be a limitation on the scope of the invention set forth in the following claims.

What is claimed is:

1. A polymer blend useful as a thermoplastic injection molding resin consisting essentially of:
   (A) at least 10 percent by weight PC which is an aromatic polycarbonate derived fom the reaction of bisphenol-A and phosgene,
   (B) at least 10 percent by weight PETG which is an amorphous polyester of terephthalic acid and a mixture of predominately ethylene glycol and a lesser amount of 1,4-cyclohexanedimethanol, and
   (C) at least 10 percent by weight ABS which is a polymer of butadiene or mixtures of butadiene and styrene or acrylonitrile grafted with styrene and acrylonitrile monomers;
   wherein said blend has the following properties:
   (1) melt flow into a mold (Spiral Flow) as measured by the proceudre for Spiral Flow of at least 25 centimeters,
   (2) heat distortion temperature under load (HDTUL) as under load (HDTUL) as measured by ASTM D648 of at least 74° C., and
   (3) thick section notched Izod impact resistance (IZOD-¼) as measured by ASTM 256-56 on a 6.4 mm thick notched specimen at 23° C. of at least about 100 Joules/meter.

2. A blend according to claim 1 comprising at least 20 percent by weight of each of PC, PETG and ABS.

3. A blend according to claim 1 comprising sufficient amounts of PC, PETG and ABS so that said Spiral Flow is at least 30 centimeters.

4. A blend according to claim 1 comprising sufficient amounts of PC, PETG and ABS so that said HDTUL is at least 80° C.

5. A blend according to claim 1 comprising sufficient amounts of PC, PETG and ABS so that said IZOD-¼ is at least 300 Joules/meter.

6. A blend according to claim 1 comprising at least 30 percent by weight ABS and having a Spiral Flow of at least 30 centimeters and an IZOD-¼ of at least 500 Joules/meter.

7. A blend according to claim 1 comprising at least 20 percent by weight PETG and having a Spiral Flow of at least 28 centimeters and an IZOD-¼ of at least 500 Joules/meter.

8. A blend according to claim 1 comprising at least 30 percent by weight PC and having a Spiral Flow of at least 30 centimeters, an IZOD-¼ of at least 500 Joules/meter and an HDTUL of at least 80° C.

9. A blend according to claim 1 comprising at least 30 percent by weight PC, at least 20 percent by weight PETG and at least 30 percent by weight ABS and having a Spiral Flow of at least 30 centimeters, an HDTUL of at least 80° C. and an IZOD-¼ of at least 500 Joules/meter.

10. A polymer blend useful as a thermoplastic injection molding resin consisting essentially of PC, PETG, graft rubber composition selected from ABS or ASA and ethylene-acrylate copolymer rubber, wherein said blend consists essentially of:
   (A) at least 20 percent by weight PC which is an aromatic polycarbonate derived from the reaction of bisphenol-A and phosgene,
   (B) at least 10 percent by weight PETG which is an amorphous polyester of terephthalic acid and a mixture of predominately ethylene glycol and a lesser amount of 1,4-cyclohexanedimethanol,
   (C) at least 20 percent by weight of graft rubber composition of ABS or ASA, wherein ABS is a polymer of butadiene or mixtures of butadiene and styrene or acrylonitrile grafted with styrene and acrylonitrile monomers and wherein ASA is a polymer of butyl acrylate grafted with styrene and acrylonitrile monomers; and
   (D) a minor amount of ethylene-acrylate copolymer rubber;
   wherein said blend has the following properties:
   (1) melt flow into a mold (Spiral Flow) as measured by the procedure for Spiral Flow of at least 27 centimeters,
   (2) heat distortion temperature under load (HDTUL) as measured by ASTM D648 of at least 75° C., and
   (3) thick section notched Izod impact resistance (IZOD-¼) as measured by ASTM 256-56 on a 6.4 cm thick notched specimen at 23° C. of at least about 300 Joules/meter.

11. A blend according to claim 10 wherein said copolymer rubber is a terpolymer of ethylene, methylacrylate and a mono ester of maleic acid.

12. A blend according to claim 11 comprising sufficient amounts of PC, PETG and rubber so that said Spiral Flow is at least 30 centimeters.

13. A blend according to claim 11 comprising sufficient amounts of PC, PETG and rubber so that said HDTUL is at least 80° C.

14. A blend according to claim 11 comprising sufficient amounts of PC, PETG and rubber so that said IZOD-¼ is at least 300 Joules/meter.

15. A blend according to claim 11 comprising at least 30 percent by weight ABS or ASA and having a Spiral Flow of at least 30 centimeters and an IZOD-¼ of at least 500 Joules/meter.

16. A blend according to claim 11 comprising at least 20 percent by weight PETG and having a Spiral Flow of at least 28 centimeters and an IZOD-¼ of at least 500 Joules/meter.

17. A blend according to claim 11 comprising at least 30 percent by weight PC and having a Spiral Flow of at least 30 centimeters, an IZOD-¼ of at least 500 Joules/meter and an HDTUL of at least 80° C.

18. A blend according to claim 11 comprising at least 30 percent by weight PC, at least 20 percent by weight PETG and at least 30 percent by weight ABS or ASA and having a Spiral Flow of at least 30 centimeters, an HDTUL of at least 80° C. and an IZOD-¼ of at least 500 Joules/meter.

* * * * *